United States Patent
Kim et al.

(10) Patent No.: US 8,259,274 B2
(45) Date of Patent: *Sep. 4, 2012

(54) LIQUID CRYSTAL DISPLAY DEVICE

(75) Inventors: Sung-Man Kim, Seoul (KR);
Myung-Koo Hur, Cheonan-si (KR);
Jong-Hwan Lee, Anyang-si (KR); Yong Woo Lee, Seoul (KR); Hong-Woo Lee, Cheonan-si (KR); Jin-Suk Seo, Cheonan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 302 days.

This patent is subject to a terminal disclaimer.

(21) Appl. No.: 12/464,420

(22) Filed: May 12, 2009

(65) Prior Publication Data
US 2009/0219477 A1    Sep. 3, 2009

Related U.S. Application Data

(63) Continuation of application No. 11/839,752, filed on Aug. 16, 2007, now Pat. No. 7,564,527.

(30) Foreign Application Priority Data

Aug. 21, 2006  (KR) .......................... 10-2006-0078908

(51) Int. Cl.
*G02F 1/1337* (2006.01)
*G02F 1/1343* (2006.01)

(52) U.S. Cl. .......................... 349/144; 349/129; 349/130

(58) Field of Classification Search .................. 349/129, 349/130, 144

See application file for complete search history.

(56) References Cited

U.S. PATENT DOCUMENTS

| | | | |
|---|---|---|---|
| 7,564,527 B2 * | 7/2009 | Kim et al. | 349/129 |
| 2006/0146242 A1 * | 7/2006 | Kim et al. | 349/129 |
| 2007/0258031 A1 * | 11/2007 | Choi et al. | 349/129 |

* cited by examiner

*Primary Examiner* — Richard Kim
*Assistant Examiner* — David Chung
(74) *Attorney, Agent, or Firm* — H.C. Park & Associates, PLC

(57) ABSTRACT

Disclosed is a liquid crystal display device including a first substrate, a second substrate, and a liquid crystal layer interposed there between. The first substrate is provided with gate lines and data lines thereon. The gate lines and data lines cross with each other and are insulated from each other. Pixel electrodes are stacked on the gate lines and data lines. Each pixel electrode includes first and second sub-pixel electrodes spaced apart from each other and a connection electrode, which connects the first sub-pixel electrode to the second sub-pixel electrode. The second substrate is provided with a common electrode thereon. The common electrode includes a first domain divider formed on the center of the first sub-pixel electrode and a second domain divider formed on the center of the second sub-pixel electrode.

8 Claims, 14 Drawing Sheets

LIQUID CRYSTAL DISPLAY DEVICE

CROSS-REFERENCE TO RELATED APPLICATION

This application is a continuation application of U.S. patent application Ser. No. 11/839,752, filed on Aug. 16, 2007, and claims priority from and the benefit of Korean Patent Application No. 10-2006-0078908, filed on Aug. 21, 2006, which are all hereby incorporated by reference for all purposes as if fully set forth herein.

BACKGROUND OF THE INVENTION

1. Field of the Invention

The present invention relates to a display device. More particularly, the present invention relates to a liquid crystal display device using liquid crystals.

2. Discussion of the Background

A liquid crystal display (LCD) device is a display apparatus, which uses liquid crystals that are in a mesomorphic phase between a liquid phase and a solid phase. The LCD device has two substrates, and a liquid crystal layer including the liquid crystals is interposed between the two substrates. The liquid crystals are aligned between the two substrates, and the alignment direction of the liquid crystals varies when an electric field is applied to the liquid crystals. In addition, since the liquid crystals have an anisotropic refractive index, the light transmittance of the LCD device varies according to the alignment of the liquid crystals. Thus, the LCD device adjusts the electric field so that the liquid crystals have the light transmittance corresponding to image information and images may be displayed.

Due to the anisotropic refractive index of the liquid crystals, the image displayed in the LCD device may b e seen as a distorted image when a person views the image from a lateral side of the LCD device. Therefore, the LCD device may have a narrow viewing angle.

SUMMARY OF THE INVENTION

The present invention provides a liquid crystal display device, which may have an increased viewing angle and may display high-quality images.

Additional features of the invention will be set forth in the description which follows, and in part will be apparent from the description, or may be learned by practice of the invention.

The present invention discloses an LCD device including a first substrate, a gate line and a data line, a first sub-pixel electrode and a second sub-pixel electrode, a second substrate, a common electrode, and a liquid crystal layer. A pixel area is defined in the first substrate. The gate line and data line are disposed on the first substrate corresponding to the pixel area. The gate line and the data line cross each other and are insulated from each other. The first sub-pixel electrode and the second sub-pixel electrode are disposed on the data line within the pixel area and spaced apart from each other. The second substrate faces the first substrate. The common electrode is disposed on the second substrate and provided with a first domain divider and a second domain divider spaced apart from each other. The first domain divider and the second domain divider divide the pixel area into a plurality of domains. The liquid crystal layer is interposed between the first substrate and the second substrate.

The first domain divider is positioned on the center of the first sub-pixel electrode, and the first domain divider and the first sub-pixel electrode extend in a first direction at an angle to a longitudinal direction of the gate line. The second domain divider is positioned on the center of the second sub-pixel electrode, and the second domain divider and the second sub-pixel electrode extend in a second direction symmetrical to the first direction with respect to the longitudinal direction of the gate line. Further, a virtual line extending from an end portion of the second domain divider in the second direction meets with an end portion of the first sub-pixel electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
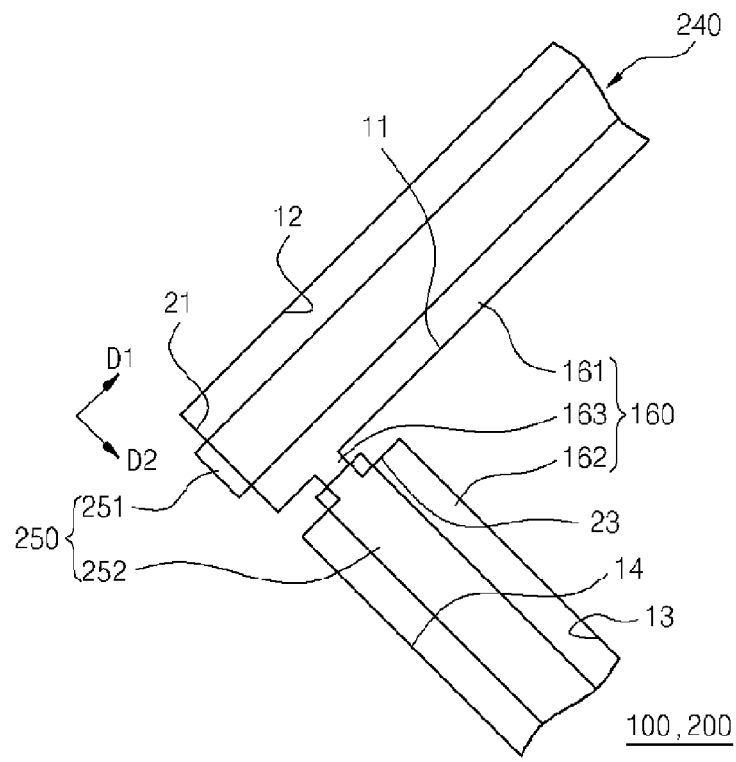
FIG. 1 is a plan view showing a portion of a pixel area of the LCD device according to a first exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

FIG. 1 is a plan view showing a portion of a pixel area of a liquid crystal display (LCD) device according to a first exemplary embodiment of the present invention. Although a plurality of pixel areas are provided in the LCD device, the following description will focus on one pixel area since all of the pixel areas have the same structure.

Referring to FIG. 1, the LCD device includes a first substrate 100 and a second substrate 200. The first substrate 100 includes pixel areas displaying an image. Each pixel area formed in the first substrate 100 is provided with a pixel electrode 160. The pixel electrode 160 includes a first sub-pixel electrode 161, a second sub-pixel electrode 162, and a connection electrode 163. The second substrate 200 is provided with a common electrode 240 corresponding to the pixel electrode 160, and the common electrode 240 includes a domain divider 250. The domain divider 250 includes a first domain divider 251 and a second domain divider 252.

The first sub-pixel electrode 161 extends in the first direction D1 and the second sub-pixel electrode 162 extends in the second direction D2. The first and second directions D1 and D2 may be perpendicular to each other as shown in FIG. 1. The first domain divider 251 is positioned on the center of the first sub-pixel electrode 161 along the first direction D1. The second domain divider 252 is positioned on the center of the second sub-pixel electrode 162 along the second direction D2.

In detail, the first sub-pixel electrode 161 includes first and second long lateral sides 11 and 12 and a first short lateral side 21. The first and second long lateral sides 11 and 12 extend in the first direction D1 while facing each other and the first short lateral side 21 connects the first long lateral side 11 to the second long lateral side 12. In addition, the first short lateral side 21 is parallel to the second direction D2 and perpendicular to the first domain divider 251. Although not shown in FIG. 1, a second short lateral side 22 (see FIG. 7), which is opposite the first short lateral side 21, is further provided.

The second sub-pixel electrode 162 includes third and fourth long lateral sides 13 and 14 and a third short lateral side 23. The third and fourth long lateral sides 13 and 14 extend in the second direction D2 while facing each other and the third short lateral side 23 connects the third long lateral side 13 to the fourth long lateral side 14. The third short lateral side 23 is parallel to the first direction D1 and perpendicular to the second domain divider 252. The third short lateral side 23 is opposite the first long lateral side 11, and the fourth long lateral side 14 is spaced apart from and parallel to the first short lateral side 21. Although not shown in FIG. 1, a fourth short lateral side 24 (see FIG. 7), which is opposite the third short lateral side 23, is further provided.

Figure 2A:
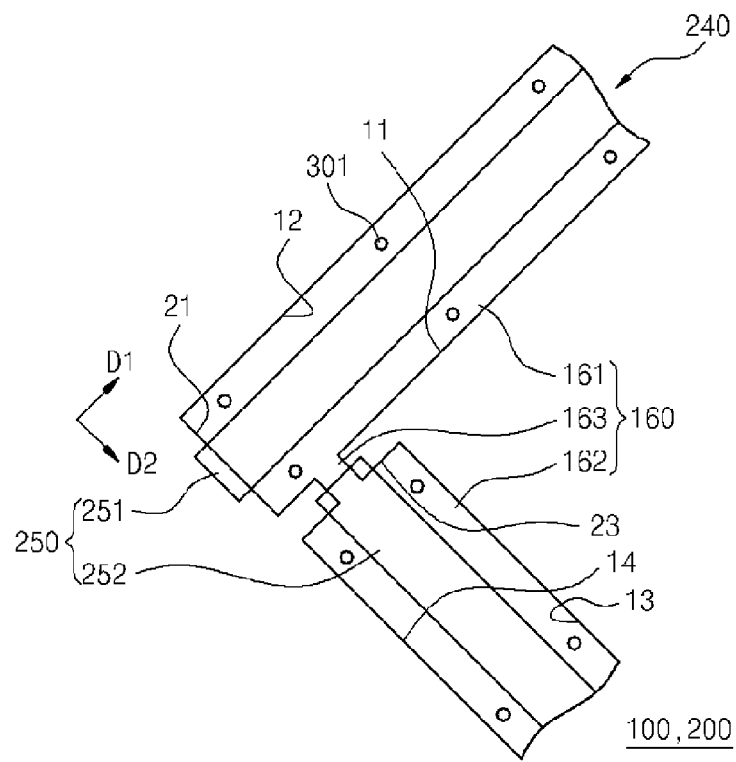
FIG. 2A and FIG. 2B are plan views showing an operational procedure of the liquid crystal display device shown in FIG. 1.
Figure 2B:
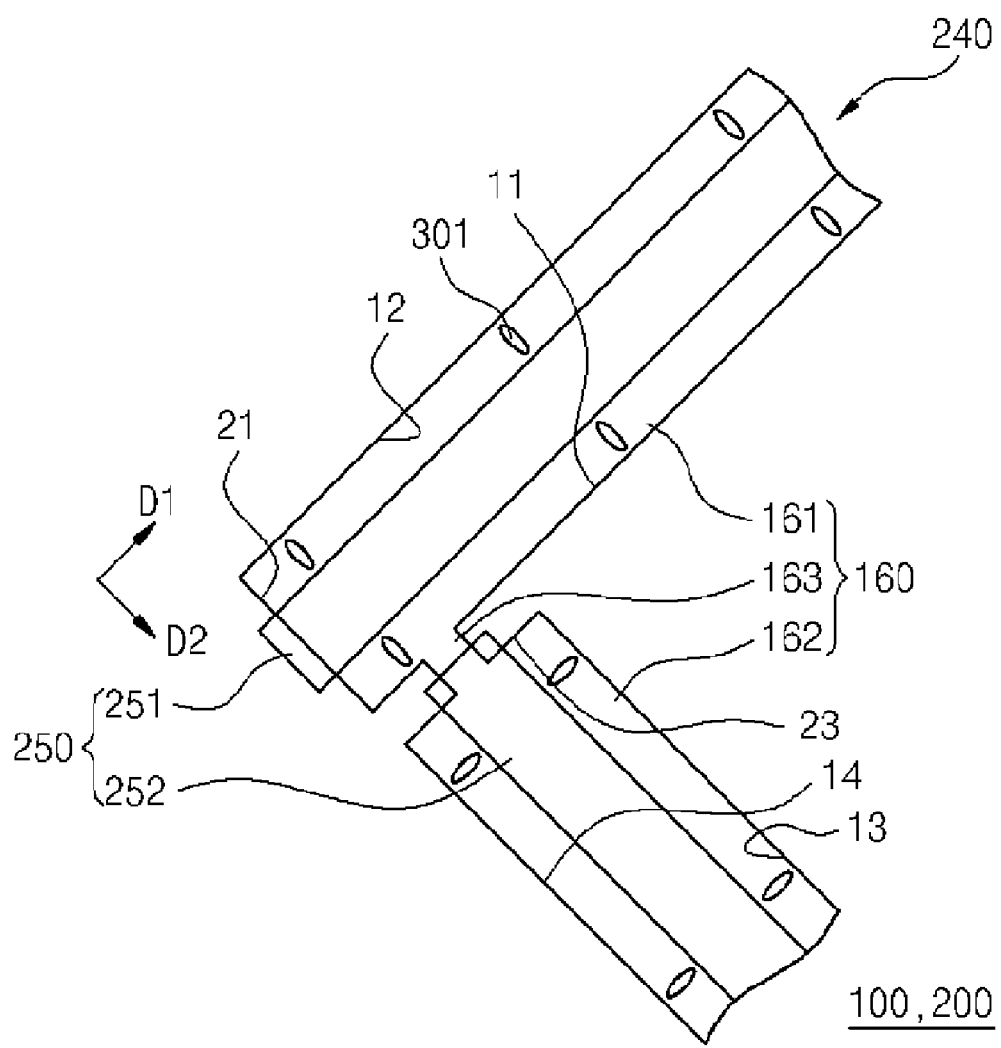

FIG. 2A and FIG. 2B are plan views showing an operational procedure of the LCD device shown in FIG. 1.

Referring to FIG. 2A, liquid crystals 301 are aligned between the first and second substrates 100 and 200. Each liquid crystal 301 has an oval shape with a long-axis and a short-axis, and the alignment direction of the liquid crystals 301 is defined according to the direction of the long-axis. The liquid crystals 301 may be aligned perpendicular to the first and second substrates 100 and 200. In this alignment state, there is no phase retardation of the light passing through the liquid crystals 301. Polarizing plates (not shown) having absorption axes perpendicular to each other may be attached to outer portions of the first and second substrates 100 and 200. The light passing through the polarizing plate attached to the outer portion of the first substrate 100 is linearly polarized. Therefore, light cannot pass through the polarizing plate attached to the outer portion the second substrate 200. As a result, the LCD device is in a black state.

Referring to FIG. 2B, when the LCD device operates, different voltages are applied to the pixel electrode 160 and the common electrode 240, respectively. A data voltage, which varies depending on image information, is applied to the pixel electrode 160 and a constant common voltage is applied to the common electrode 240. Due to the difference between the common voltage and the data voltage, an electric field is generated between the first and second substrates 100 and 200. In response to the electric field, the alignment direction of the liquid crystals 301 inclines with respect to the first and second substrates 100 and 200.

In this alignment state, the liquid crystals 301 cause phase retardation to the light passing through the liquid crystals 301. The extent of the phase retardation may vary depending on the degree of inclination of the liquid crystals 301, and the degree of inclination may be adjusted by altering the intensity of the electric field applied thereto. The light, which is linearly polarized while passing through the polarizing plate externally attached to the first substrate 100, is subjected to phase retardation when passing through the liquid crystals 301. Accordingly, the light having phase retardation may pass through the polarizing plate externally attached to the second substrate 200, thereby displaying an image.

The domain divider 250 changes the alignment direction of the liquid crystals 301 at both sides thereof. That is, the domain divider 250 may be a cut-out section formed by cutting a predetermined region of the common electrode 240 or an insulating protrusion protruding from the common electrode 240. However, since the common voltage cannot be applied to a cut-out section or an insulating protrusion, the intensity and/or the direction of the electric fields changes. The changed electric field is symmetrically represented at both sides of the domain divider 250.

Accordingly, the alignment directions of the liquid crystals 301 differ from each other at both sides of the domain divider 250. If the pixel area is divided according to the alignment direction of the liquid crystals 301 and each divided area is considered one domain, the pixel area may be divided into a plurality of domains by the domain divider 250. Since the liquid crystals 301 are aligned differently in different domains, optical characteristics may be compensated for in the domains, which may increase the viewing angle of the LCD device.

The liquid crystals 301 are aligned vertically to the domain divider 250 when viewed in a plan view. However, the alignment direction of the liquid crystals 301 may be scattered at a boundary area of the domain. For example, if the first and second domain dividers 251 and 252 are connected to each other, the liquid crystals 301 adjacent to the connection area may be affected by both the first and second domain dividers 251 and 252, such that these liquid crystals 301 are not aligned in a single direction, but rather, are scattered.

According to the present exemplary embodiment, the first and second sub-pixel electrodes 161 and 162 are separated from each other by the connection electrode 163, and the first and second domain dividers 251 and 252 are positioned apart from each other within the first and second sub-pixel electrodes 161 and 162, respectively. As a result, the liquid crystals 301 on the first sub-pixel electrodes 161 are controlled by the first domain divider 251 only, so that these liquid crystals 301 may be aligned in the direction perpendicular to the first direction D1. In addition, the liquid crystals 301 on the second sub-pixel electrodes 162 are controlled by the second domain divider 252 only, so that these liquid crystals 301 may be aligned in the direction perpendicular to the second direction D2. Therefore, it may be possible to prevent scattering in the alignment of the liquid crystals 301, thereby allowing for high quality images to be obtained.

Figure 3:
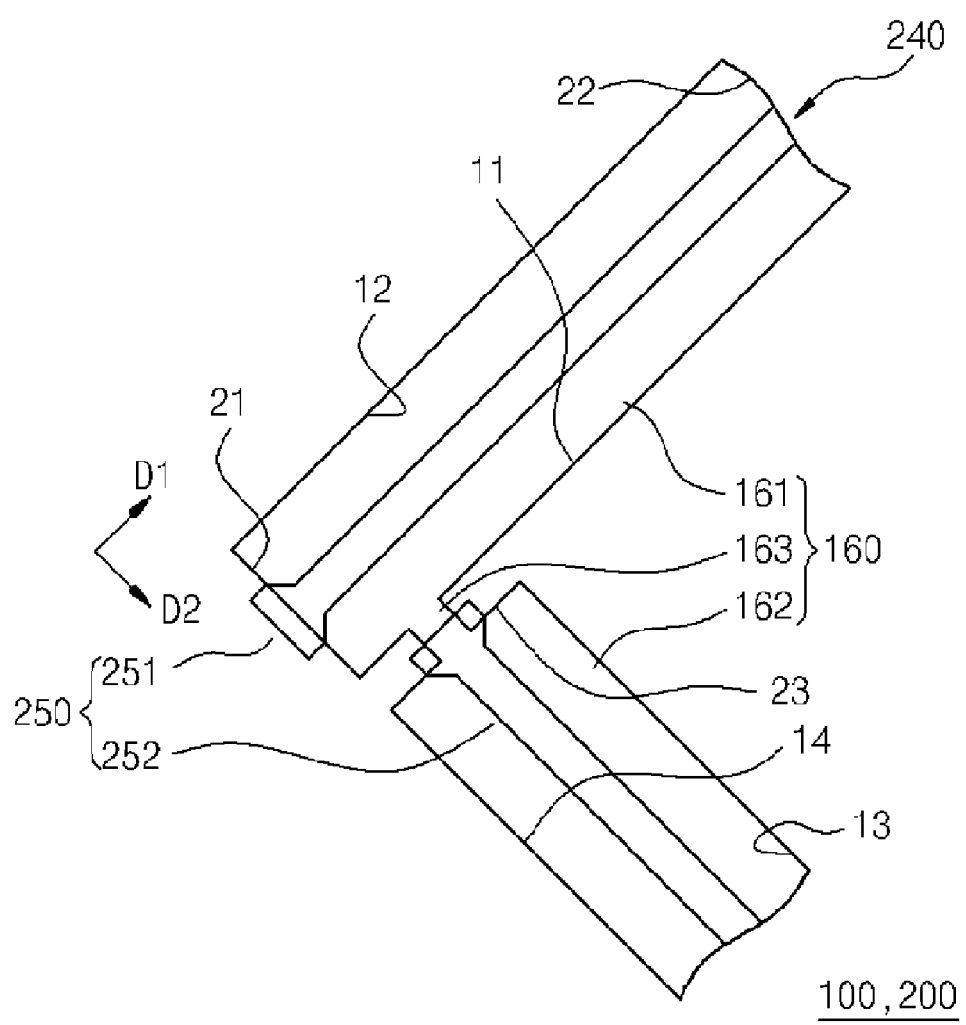
FIG. 3 is a plan view showing a portion of a pixel area of the LCD device according to a second exemplary embodiment of the present invention.

FIG. 3 is a plan view showing a portion of a pixel area of the LCD device according to a second exemplary embodiment of the present invention. In the second exemplary embodiment, the same reference numerals will be assigned to elements that are identical to elements in the first exemplary embodiment and a detailed description thereof will be omitted below.

Referring to FIG. 3, the LCD device includes a first substrate 100 having a pixel electrode 160 and a second substrate 200 having a common electrode 240. The pixel electrode 160 includes a first sub-pixel electrode 161, a second sub-pixel electrode 162, and a connection electrode 163. The common electrode 240 includes a domain divider 250. The domain divider 250 includes a first domain divider 251 and a second domain divider 252. The thickness of the first and second domain dividers 251 and 252 is not uniform. The first and second domain dividers 251 and 252 have expanded portions, which have increased widths, at the end portions thereof.

Figure 4A:
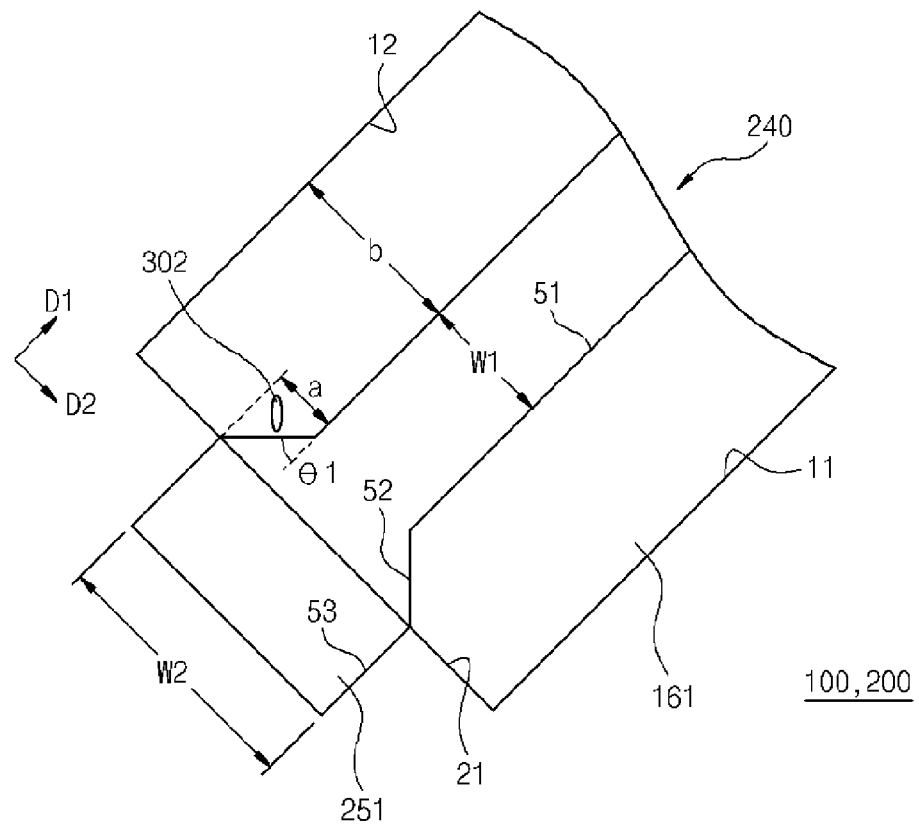
FIG. 4A is a plan view showing an end portion of the first sub-pixel electrode of FIG. 3.

FIG. 4A is a plan view showing an end portion of the first sub-pixel electrode of FIG. 3.

Referring to FIG. 4A, the first domain divider 251 includes a body 51, a connection portion 52 and an expanded portion 53. The body 51 occupies most of the region in which the first domain divider 251 is disposed and extends in the first direction D1. The expanded portion 53 is positioned at an end portion of the first domain divider 251, and the connection portion 52 connects the body 51 to the expanded portion 53.

The body 51 has a first width W1. The expanded portion 53 has a second width W2, which is wider than the first width W1, and is formed at an outer portion of the first sub-pixel electrode 161. The connection portion 52 is inclined at a constant slope so that the width of the connection part 52 gradually increases from the first width W1 to the second width W2.

As mentioned above, the first domain divider 251 is prepared in the form of a cut-out section or a protrusion so as to exert an effect on the alignment of the liquid crystals 301. Such an effect is also applicable for the pixel electrode 160. For instance, in the first sub-pixel electrode 161, the first short lateral side 21 is adjacent to the pixel electrode belonging to the other pixel area, and an interval between the adjacent pixel electrodes can be considered to be the cut-out section. Therefore, in the first sub-pixel electrode 161, the liquid crystals 302 adjacent to the first short lateral side 21 are predisposed to align in the first direction D1 due to the effect of the first short lateral side 21. The liquid crystals 302 also are predisposed to align in the second direction D2 due to the effect of the first domain divider 251. Such an opposite alignment tendency may cause the alignment of the liquid crystals 302 to be scattered.

In the present exemplary embodiment, the connection portion 52 has a constant slope and serves to enable the liquid crystals 302 to align in an intermediate direction between the first and second directions D1 and D2. The intermediate direction varies depending on an inclination angle θ1, which is formed between the connection portion 52 and the first direction D1. The inclination angle θ1, in the first domain divider 251, depends on a ratio of the width W1 of the body 51 to the length of the first short lateral side 21.

For example, a first length 'a', which corresponds to half of the length difference between the second width W2 and the first width W1, and a second length 'b', which is the distance between the body 51 and the outermost portion of the second long lateral side 12, are taken into consideration. When the second length 'b' is approximately twice the first length 'a', the inclination angle θ1 may be set to about 45°, which lies halfway between the first and second directions D1 and D2. In addition, when the second length 'b' is longer or shorter than twice the first length 'a', the inclination angle θ1 may be set in a range of about 0° to about 90° according to the difference in the lengths.

In this manner, by forming the inclined connection portion 52 at the end portion of the first domain divider 251, it may be possible to prevent scattering of the alignment of the liquid crystal 302 in the area provided with the connection portion 52, so that high quality images may be displayed.

The operation of the connection portion 52 and the expanded portion 53 provided in the first domain divider 251 has been discussed with reference to the first sub-pixel electrode 161. The connection portion 52 and the expanded portion 53 are also applicable to the second domain divider 252 of the second sub-pixel electrode 162 having the same structure and function.

Figure 4B:
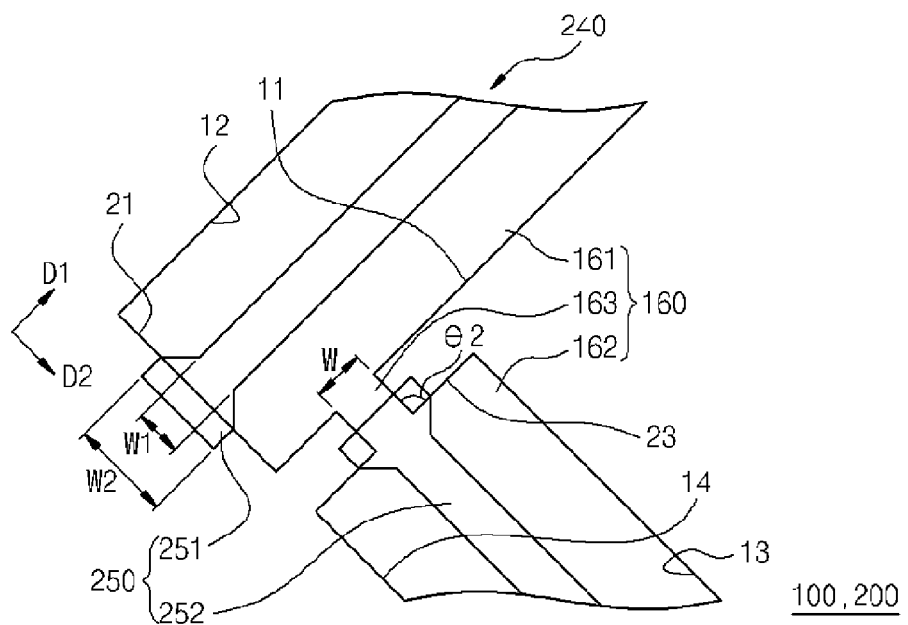
FIG. 4B is a plan view showing the connection electrode of FIG. 3.

FIG. 4B is a plan view showing the connection electrode of FIG. 3.

Referring to FIG. 4B, the connection electrode 163 serves to connect the first sub-pixel electrode 161 to the second sub-pixel electrode 162 so that the same voltage may be applied to both electrodes. The connection electrode 163 connects the first sub-pixel electrode 161 to the second sub-pixel electrode 162 and has a width corresponding to that of the domain divider 250. For example, the width W of the connection electrode may be equal to or less than the width W1 of the body 51 or, alternatively may be greater than the width of the body W1 and less than the width W2 of the expanded portion 53.

The length of the connection electrode 163 may vary according to the angle θ2 formed between the connection electrode 163 and the third short lateral side 23. In addition, the angle θ2 may range from an acute angle to an obtuse angle (i.e. 10°<θ<170°). For example, the angle θ2 may be a right angle when the connection electrode 163 is long enough to connect the first sub-pixel electrode 161 to the second sub-pixel electrode 162.

Figure 5:
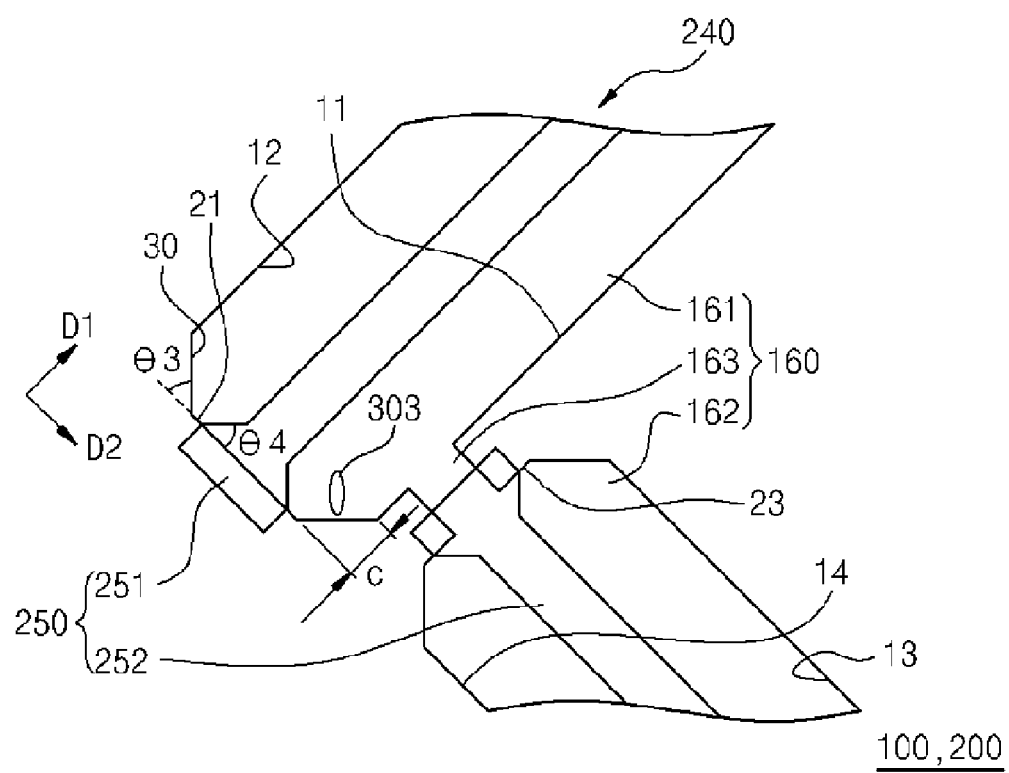
FIG. 5 is a plan view showing a portion of a pixel area of the LCD device according to a third exemplary embodiment of the present invention.

FIG. 5 is a plan view showing a portion of a pixel area of the LCD device according to a third exemplary embodiment of the present invention.

Referring to FIG. 5, the LCD device includes a first substrate 100 having a pixel electrode 160 and a second substrate 200 having a common electrode 240. The pixel electrode 160 includes a first sub-pixel electrode 161, a second sub-pixel electrode 162, and a connection electrode 163. The common electrode 240 includes a domain divider 250.

The first sub-pixel electrode 161 includes a first short lateral side 21 and first and second long lateral sides 11 and 12. The second sub-pixel electrode 162 includes a third short lateral side 23, and third and fourth long lateral sides 13 and 14. Edges of the first and third short lateral sides 21 and 23 are chamfered, respectively. The chamfered portions may serve the same function as the connection portion 52 of the domain divider 250 described in the previous exemplary embodiment.

As an example, liquid crystals 303, which are aligned at an edge portion where the first short lateral side 21 of the first sub-pixel electrode 161 meets the first long lateral side 11, will be described below. The liquid crystals 303 are predisposed to be aligned in the first direction D1 due to the influence of the first short lateral side 21 and in the second direction D2 due to the influence of the first long lateral side 11. As a result, the liquid crystals 303 may not align in one direction, but rather, may be scattered. The chamfered portions may enable the liquid crystals 303 to align in an intermediate direction that lies halfway between the first and second directions D1 and D2.

Hereinafter, the configuration and dimension of the chamfered portions will be described. The chamfered portions have shapes corresponding to the connection portion 52 that plays the same role as the chamfered portions. For example, the chamfered portions may have oblique surfaces corresponding to the connection portion 52.

In this case, an angle θ3 formed between the first short lateral side 21 and the chamfered oblique surface 30 corresponds to an angle θ4, which is the inclination angle of the connection portion 52 relative to the second direction D2. The angle θ3 may be adjusted in the range of about 0° to about 90° based on the length of the first short lateral side 21. When the height 'c' of the chamfered portion defined between the first short lateral side 21 and the second long lateral side 12 increases, the length of the chamfered oblique surface 30 becomes longer. As the length of the chamfered oblique surface 30 becomes longer, the aperture ratio decreases, so that restriction of the height 'c' is necessary. For example, the height 'c' is may be less than or equal to half of the length of the first short lateral side 21.

The chamfered portions formed on the first sub-pixel electrode 161 may affect the second domain divider 252 in the same way. Therefore, by chamfering the edges of the end portions of the first and second sub-pixel electrodes 161 and 162, it may be possible to prevent scattering of the alignment of the liquid crystals 303 in the area provided with the chamfered portions, so that high quality images may be displayed.

Figure 6A:
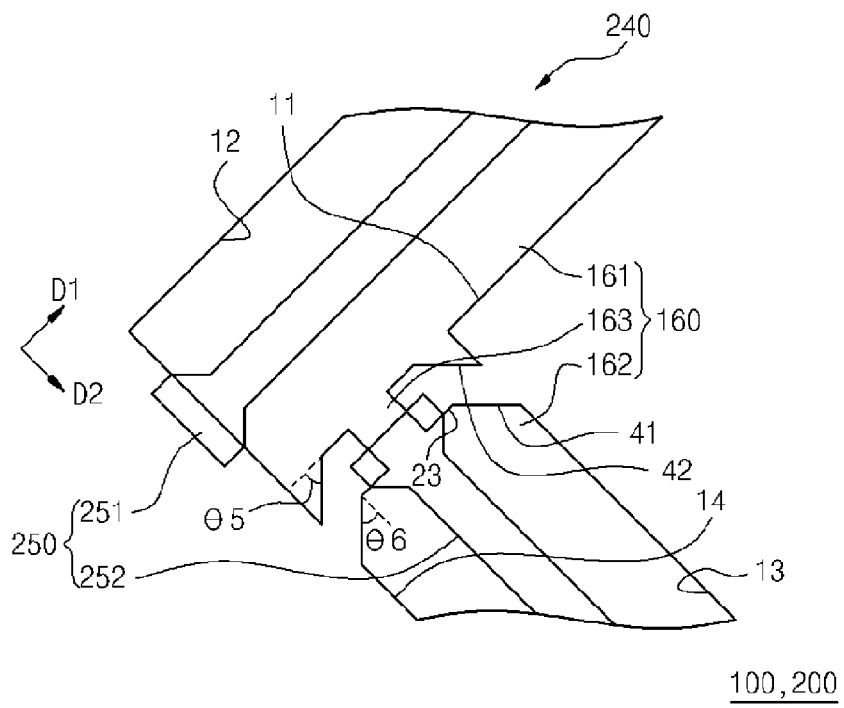
FIG. 6A and FIG. 6B are plan views showing a portion of a pixel area of the LCD device according to fourth and fifth exemplary embodiments of the present invention, respectively.
Figure 6B:
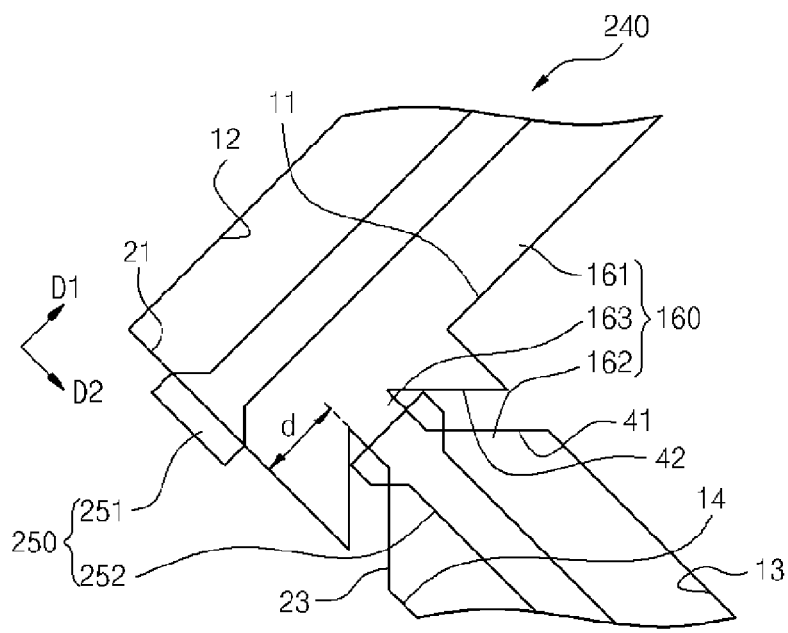

FIG. 6A and FIG. 6B are plan views showing a portion of a pixel area of the LCD device according to fourth and fifth exemplary embodiments of the present invention, respectively.

Referring to FIG. 6A, both edges of the third short lateral side 23 of the second sub-pixel electrode 162 are chamfered. The first long lateral side 11 of the first sub-pixel electrode 161 includes protruded portions corresponding to the third short lateral side 23. Both the chamfered portions and the protruded portions have oblique shapes and the chamfered portions face the protruded portions.

The chamfered oblique surface 41 has a function identical to that of the third exemplary embodiment. The protruded oblique surface 42 covers an area equal to that removed when the third short lateral side 23 is chamfered. Therefore, the aperture ratio of the LCD device by the protruded oblique surface 42 may be maintained despite the chamfered portions.

The chamfered oblique surface 41 and the protruded oblique surface 42 correspond to each other in shape and dimension. For example, the inclination angle θ5 formed between the protruded oblique surface 42 and the first direction D1 is closely related to the inclination angle θ6 formed between the chamfered oblique surface 41 and the second direction D2. That is, the sum of both angles (θ5+θ6) may be 90°, for example, each angle may be 45°.

Referring to FIG. 6B, the bottom side length 'd' of the protruded portion in the first long lateral side 11 is limited in order to prevent the protruded oblique surface 42 from overlapping with the second domain divider 252. The reason for this is that if the protruded oblique surface 42 overlaps with the second domain divider 252, the alignment of the liquid crystal in the first sub-pixel electrode 161 may be influenced by the second domain divider 252. For example, when each of the angles θ5 and θ6 is 45°, the length 'd' may be equal to or less than the distance between the first short lateral side 21 and the third short lateral side 23.

Figure 7:
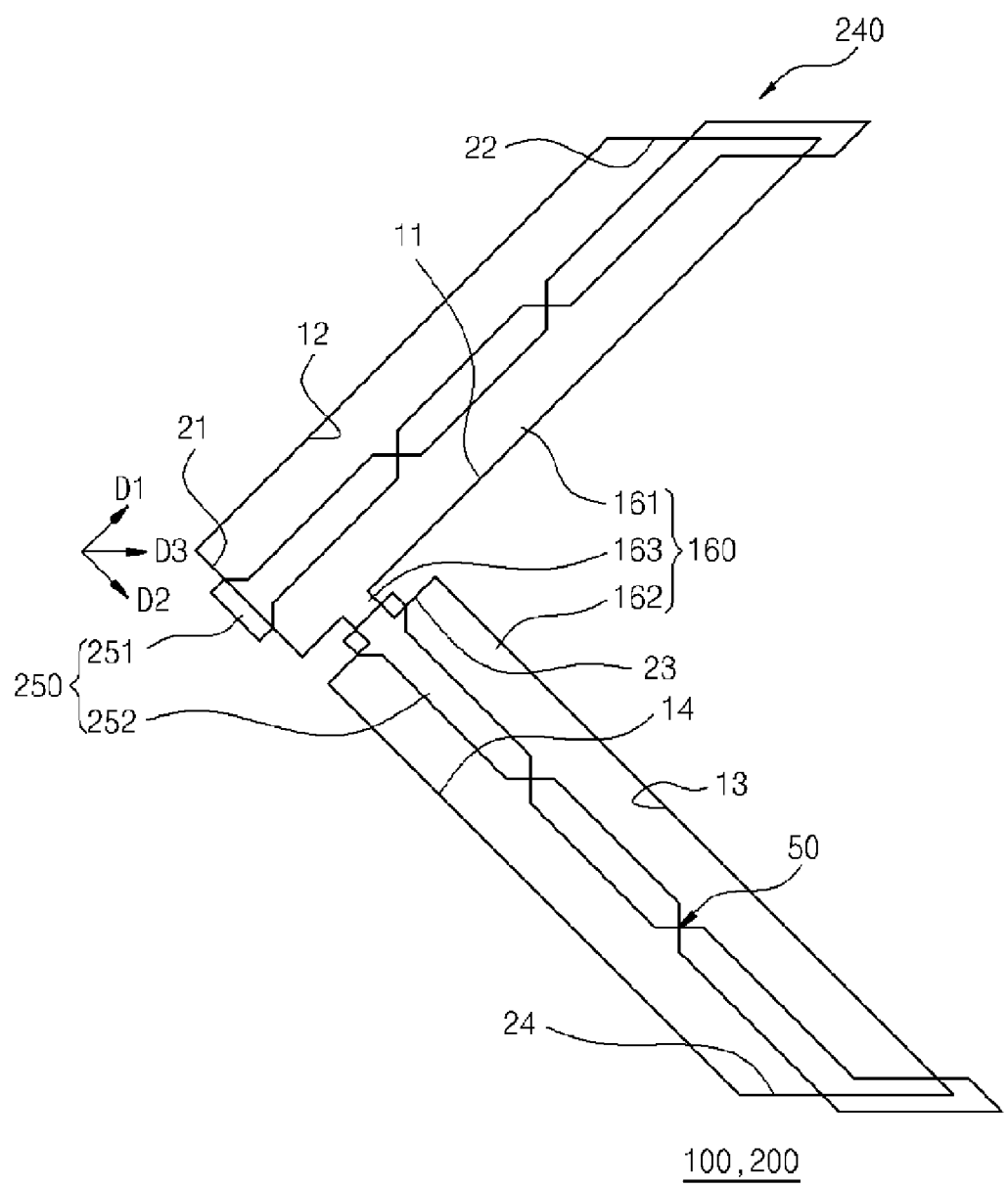
FIG. 7 is a plan view showing a portion of a pixel area of the LCD device according to a sixth exemplary embodiment of the present invention.

FIG. 7 is a plan view showing a portion of a pixel area of the LCD device according to a sixth exemplary embodiment of the present invention.

Referring to FIG. 7, the first sub-pixel electrode 161 includes first and second long lateral sides 11 and 12 and first and second short lateral sides 21 and 22. The first and second long lateral sides 11 and 12 extend parallel to each other in the first direction D1. The first short lateral side 21 is parallel to the second direction D2, and the second short lateral side 22 is parallel to the third direction D3. The first and second directions D1 and D2 are symmetrical to each other with respect to the third direction D3.

The first domain divider 251 extends in the first direction D1. In the region where the first short lateral side 21 is provided, the first domain divider 251 is perpendicular to the first short lateral side 21 and the width of the first domain divider 251 gradually increases. Meanwhile, in the region where the second short lateral side 22 is provided, the first domain divider 251 is parallel to the second short lateral side 22 and the width of the first domain divider 251 is uniform.

The first substrate 100 is provided with signal lines (not shown) transferring various signals and defining the pixel areas. The signal lines are adjacent to the first sub-pixel electrode 161 and extend in the third direction D3. The second short lateral side 22 also extends in the third direction D3. In this case, the second short lateral side 22 may be as close as possible to the signal lines so as to increase the aperture ratio. The end portion of the first domain divider 251 has a shape corresponding to that of the second short lateral side 22.

The second sub-pixel electrode 162 includes third and fourth long lateral sides 13 and 14, and third and fourth short lateral sides 23 and 24. The third and fourth long lateral sides 13 and 14 extend in the second direction D2 parallel to each other. The third short lateral side 23 extends parallel to the first direction D1, and the fourth short lateral side 24 extends parallel to the third direction D3.

The second domain divider 252 extends in the second direction D2. In the region where the third short lateral side 23 is provided, the second domain divider 252 is perpendicular to the third short lateral side 23 and the width of the second domain divider 252 gradually increases. Meanwhile, in the region where the fourth short lateral side 24 is provided, the second domain divider 252 is parallel to the fourth short lateral side 24 and the width of the second domain divider 252 is uniform.

The fourth short lateral side 24 extends parallel to the signal lines. The fourth short lateral side 24 may be as close as possible to the signal lines so as to increase the aperture ratio. The end portion of the second domain divider 252 has a shape corresponding to that of the fourth short lateral side 24.

Meanwhile, the domain divider 250 includes at least one notch 50. The notch 50 may be prepared by cutting a portion of the domain divider 250 to form a recess. Alternatively, the notch 50 may be a protrusion protruding from the domain divider 250. The notch 50 is provided to adjust the alignment of the liquid crystals positioned in the area, within which the domain divider 250 is formed, without scattering the liquid crystals.

Figure 8:
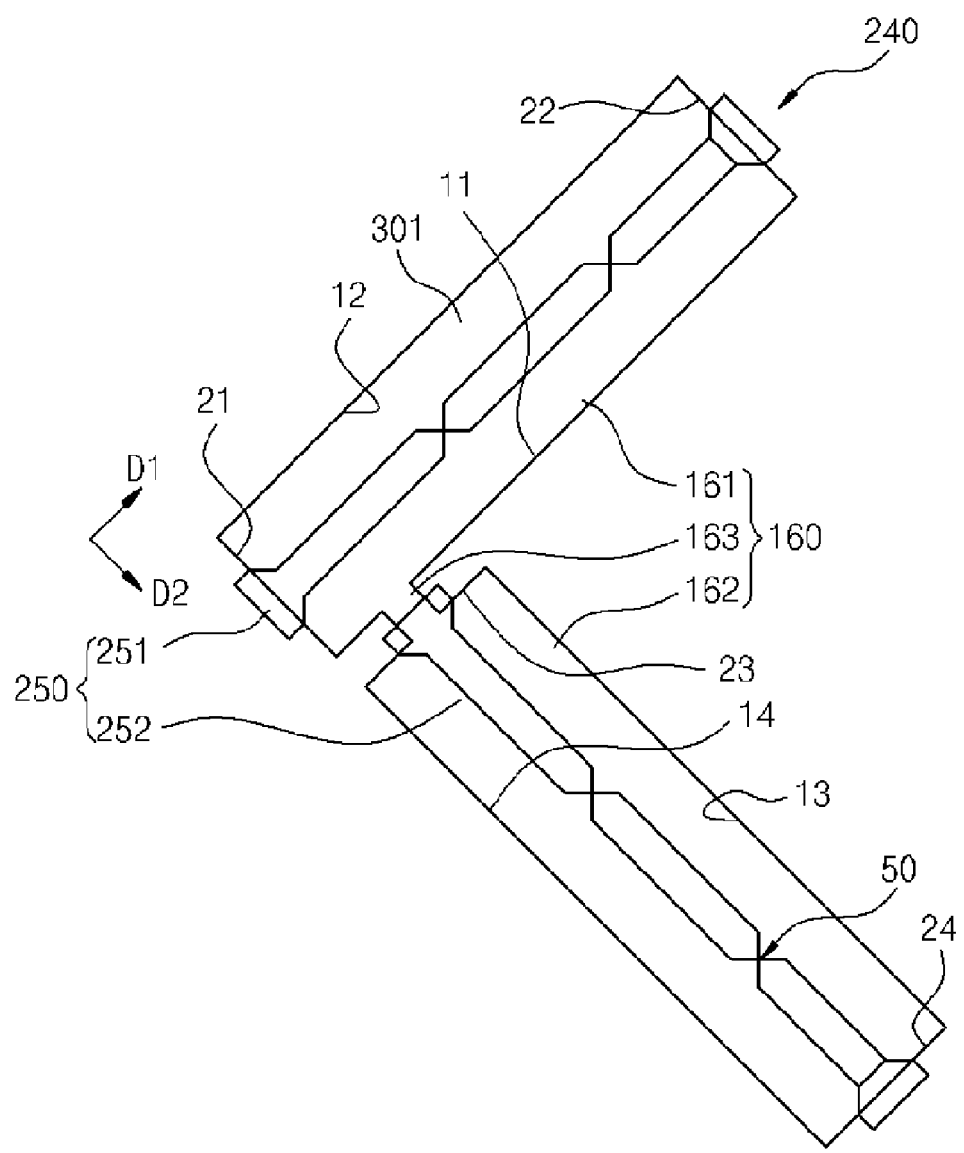
FIG. 8 is a plan view showing a portion of a pixel area of the LCD device according to a seventh exemplary embodiment of the present invention.

FIG. 8 is a plan view showing a portion of a pixel area of an LCD device according to a seventh exemplary embodiment of the present invention.

Referring to FIG. 8, the first and second sub-pixel electrodes 161 and 162 have rectangular shapes. The first and second short lateral sides 21 and 22 extend parallel to each other in the second direction D2. The third and fourth short lateral sides 23 and 24 extend parallel to each other in the first direction D1. The first domain divider 251 extends in the first direction D1 and the widths of both end portions of the first domain divider 251 gradually increase. The second domain divider 252 extends in the second direction D2 and the widths of both end portions of the second domain divider 252 gradually increase.

Therefore, the first short lateral side 21 and one end portion of the first domain divider 251 corresponding to the first short lateral side 21 have the same shape as the second short lateral side 22 and the opposite end portion of the first domain divider 251 that corresponds to the second short lateral side 22. As a result, the liquid crystals may be uniformly aligned over the whole area of the first sub-pixel electrode 161. Similarly, the liquid crystals may be uniformly aligned over the whole area of the second sub-pixel electrode 162, which may improve the quality of the image displayed in the LCD device.

Figure 9:
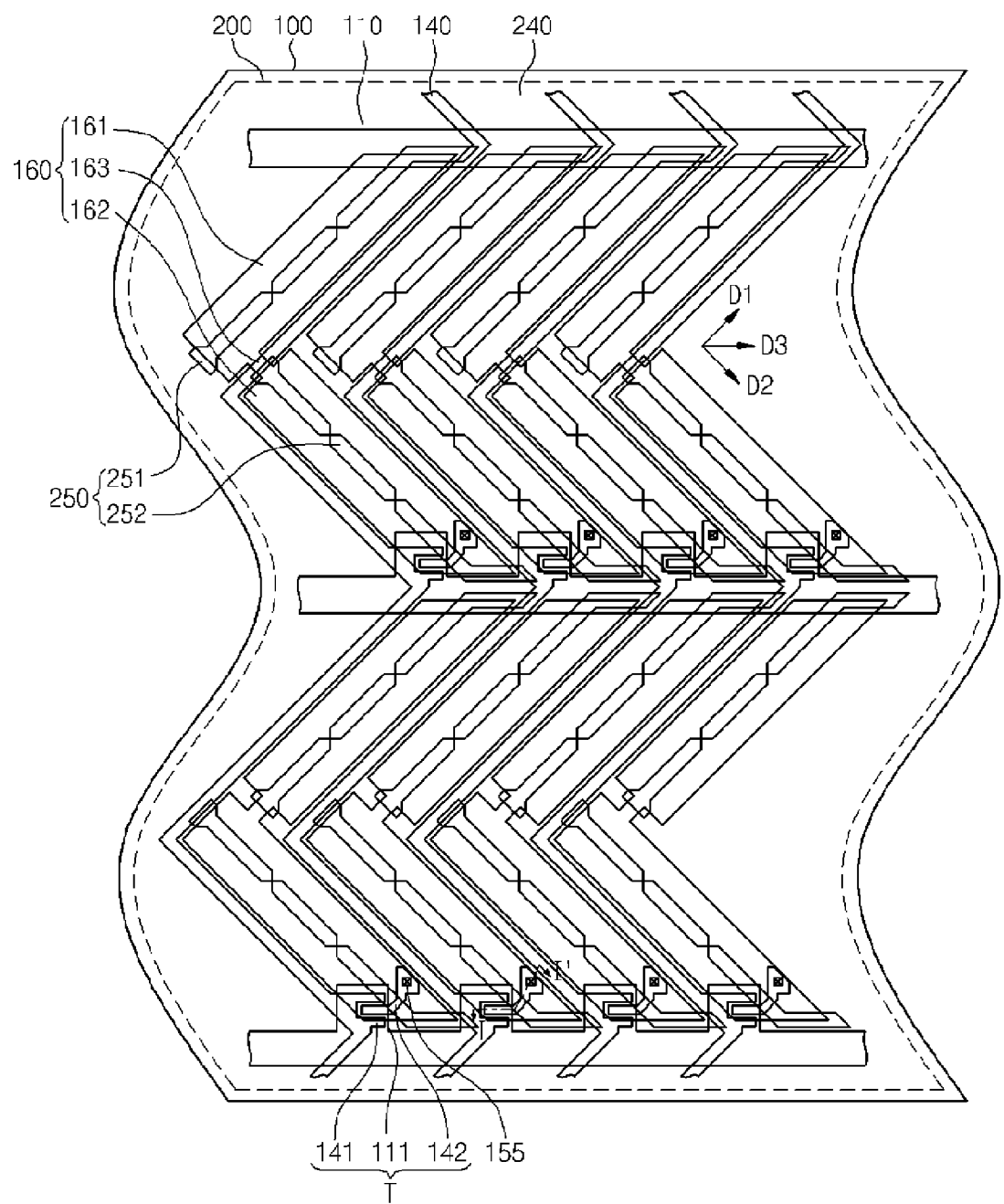
FIG. 9 is a plan view showing the LCD device according to an eighth exemplary embodiment of the present invention.
Figure 10:
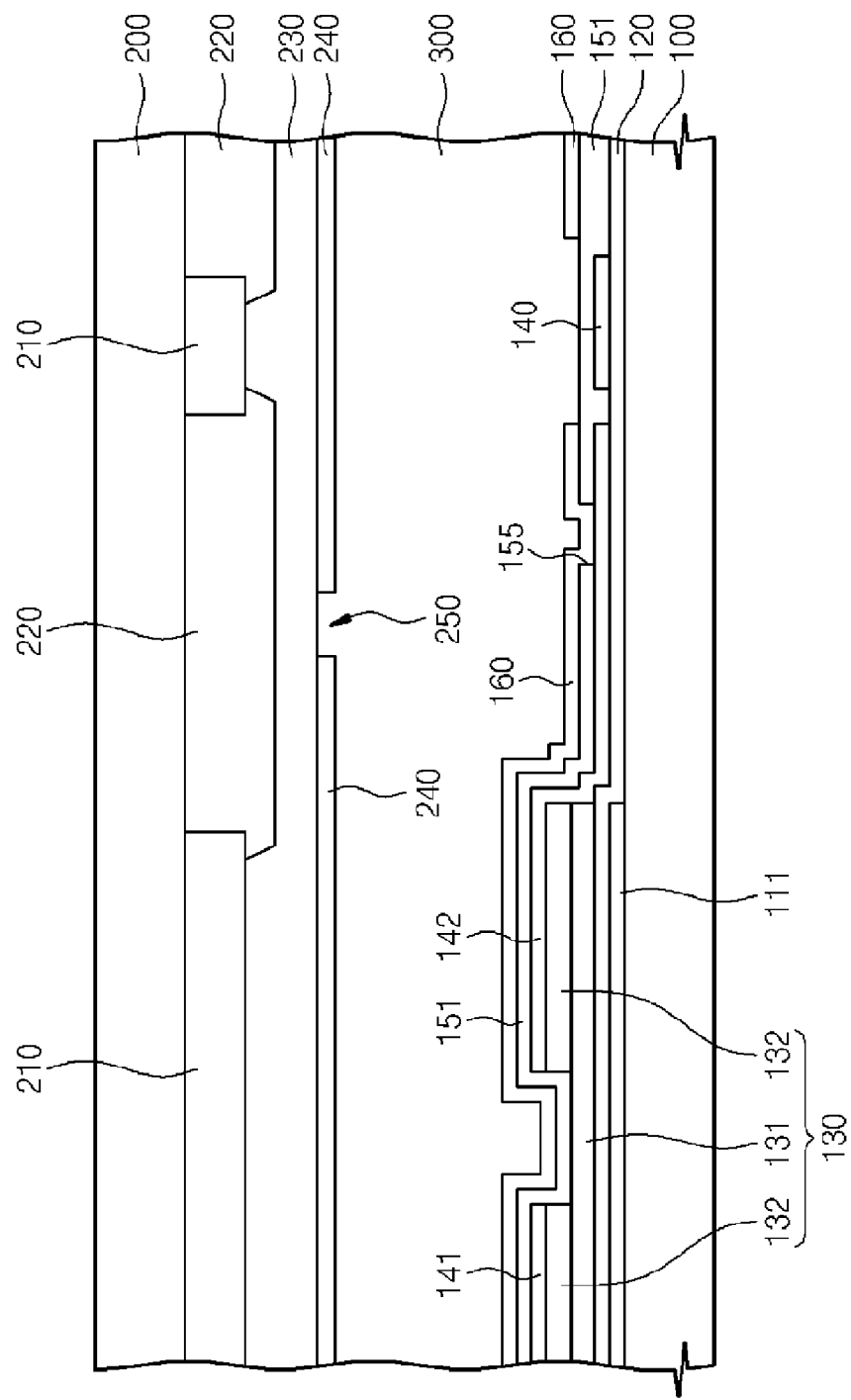
FIG. 10 is a sectional view taken along line I-I' of FIG. 9.

FIG. 9 is a plan view showing an LCD device according to an eighth exemplary embodiment of the present invention, and FIG. 10 is a sectional view taken along line I-I' in FIG. 9.

Referring to FIG. 9 and FIG. 10, the LCD device includes first and second substrates 100 and 200 and a liquid crystal layer 300 interposed there between. A plurality of gate lines 110 and data lines 140 crossing each other are formed on the first substrate 100 and a plurality of pixel areas are defined by the crossings of the gate lines 110 and the data lines 140. The pixel areas are repeatedly formed with the same structure, and each pixel area is provided with a thin film transistor T and a pixel electrode 160.

The data lines 140 extend in the first and second directions D1 and D2 while being curved symmetrical to each other, and the gate lines 110 linearly extend in the third direction D3. The first and second directions D1 and D2 are symmetrical to each other with respect to the third direction D3.

The thin film transistor T includes a gate electrode 111, a source electrode 141, and a drain electrode 142. The gate electrode 111 is formed on the first substrate 100 and branched from the gate lines 110. In addition, the gate electrode 111 is insulated by means of a gate insulating layer 120 covering the entire surface of the first substrate 100. A semiconductor pattern 130 corresponding to the gate electrode 111 is formed on the gate insulating layer 120. The semiconductor pattern 130 includes an active pattern 131 that includes an intrinsic semiconductor, and an ohmic contact pattern 132 that includes a semiconductor doped with impurities. The ohmic contact pattern 132 is divided into two different parts along which the source electrode 141 and the drain electrode 142 are formed. The source electrode 141 extends from the data lines 140, and the drain electrode 142 is spaced apart from the source electrode 141.

The source electrode 141 and the drain electrode 142 are provided thereon with a protective layer 151 that covers the entire surface of the substrate 100. The protective layer 151 may include an inorganic substance, such as a silicon nitride layer. The protective layer 151 also includes a contact hole 155 to expose the drain electrode 142. The protective layer 151 is provided thereon with a pixel electrode 160, and the pixel electrode 160 is connected to the drain electrode 142 via the contact hole 155.

A light blocking film pattern 210, a color filter 220, an overcoat layer 230, and a common electrode 240 are formed on the second substrate 200. The light blocking film pattern 210 is arranged on a boundary region of the pixel area and a region corresponding to the thin film transistor T in order to block light at a corresponding position. The color filter 220 is formed on the light blocking film pattern 210, and may filter light having red, green, and blue colors, which are the three primary colors of light, so as to display color images. The overcoat layer 230 planarizes the surface of the second substrate 200 which is stepped due to the light blocking film pattern 210 and the color filter 220. The overcoat layer 230 also serves to protect the color filter 220. A common electrode 240 is formed on the overcoat layer 230, and includes the domain divider 250 that is obtained by cutting a predetermined region of the common electrode 240.

When viewed in a plan view, the pixel electrode 160 has a shape identical to that of the sixth exemplary embodiment described above. In other words, the pixel electrode 160 includes the first sub-pixel electrode 161 extending in the first direction D1 and the second sub-pixel electrode 162 extending in the second direction D2. End portions of the first and second sub-pixel electrodes 161 and 162 are aligned in the third direction D3 in a region adjacent to the gate lines 110. The first and second sub-pixel electrodes 161 and 162 are asymmetrical to each other, and two pixel electrodes 160 adjacent to each other about the gate lines 110 mirror each other.

When the LCD device operates, the gate signal is transmitted to the gate lines 110, so that the thin film transistors T are turned on. The data signal corresponding to image information is transmitted to the data lines 140, and data voltage is applied to the pixel electrodes 160 through the thin film transistor T.

When the data signal has been transmitted, an electric field is generated from the data lines 140, and the electric field may exert an influence upon the alignment of the liquid crystals. As shown in FIG. 9, if the pixel electrode 160 and the data lines 140 extend in same direction, the data lines 140 and the domain divider 250 are parallel to each other. In this case, the electric field generated from the data lines 140 is applied in the direction identical to the alignment direction of the liquid crystal by the domain divider 250. Therefore, the liquid crystals may be rapidly aligned when the electric field is applied thereto, so that the operational speed of the LCD device may be improved.

Figure 11:
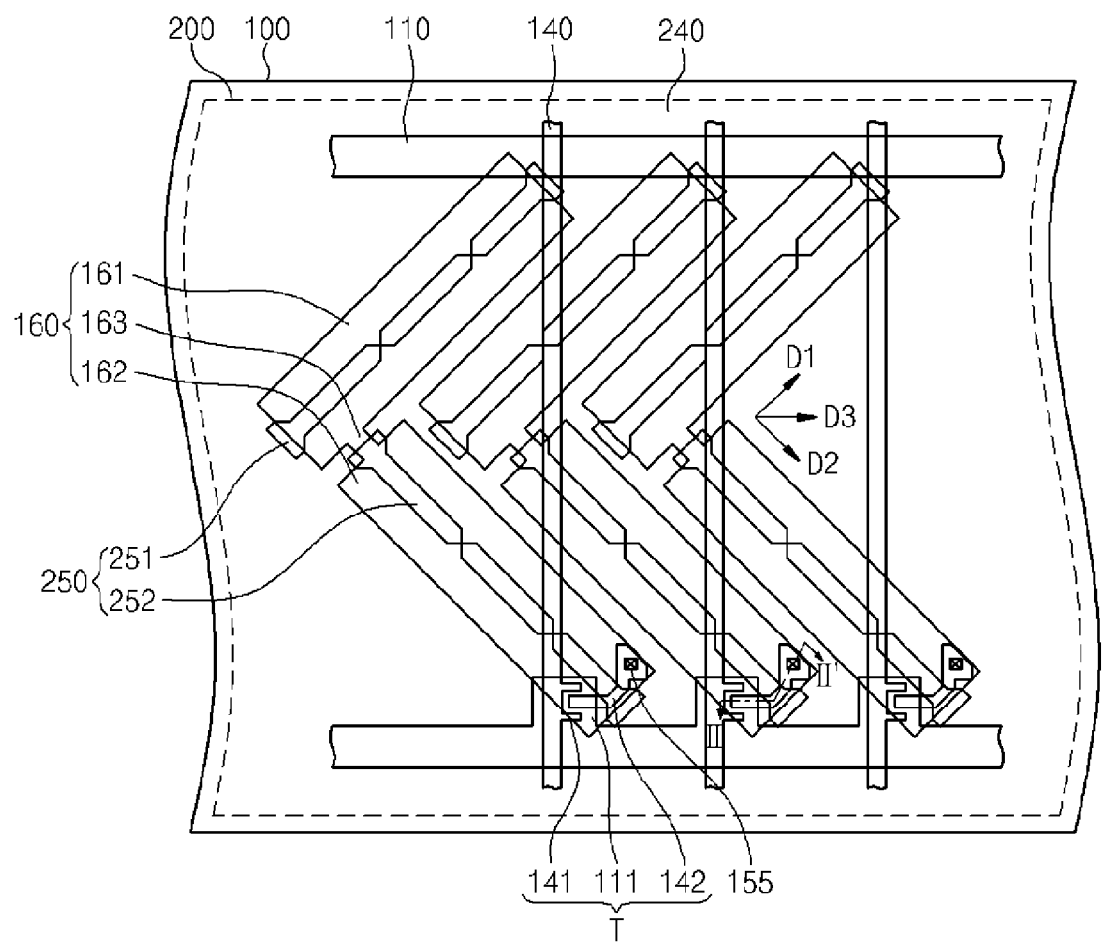
FIG. 11 is a plan view showing the LCD device according to a ninth exemplary embodiment of the present invention.
Figure 12:
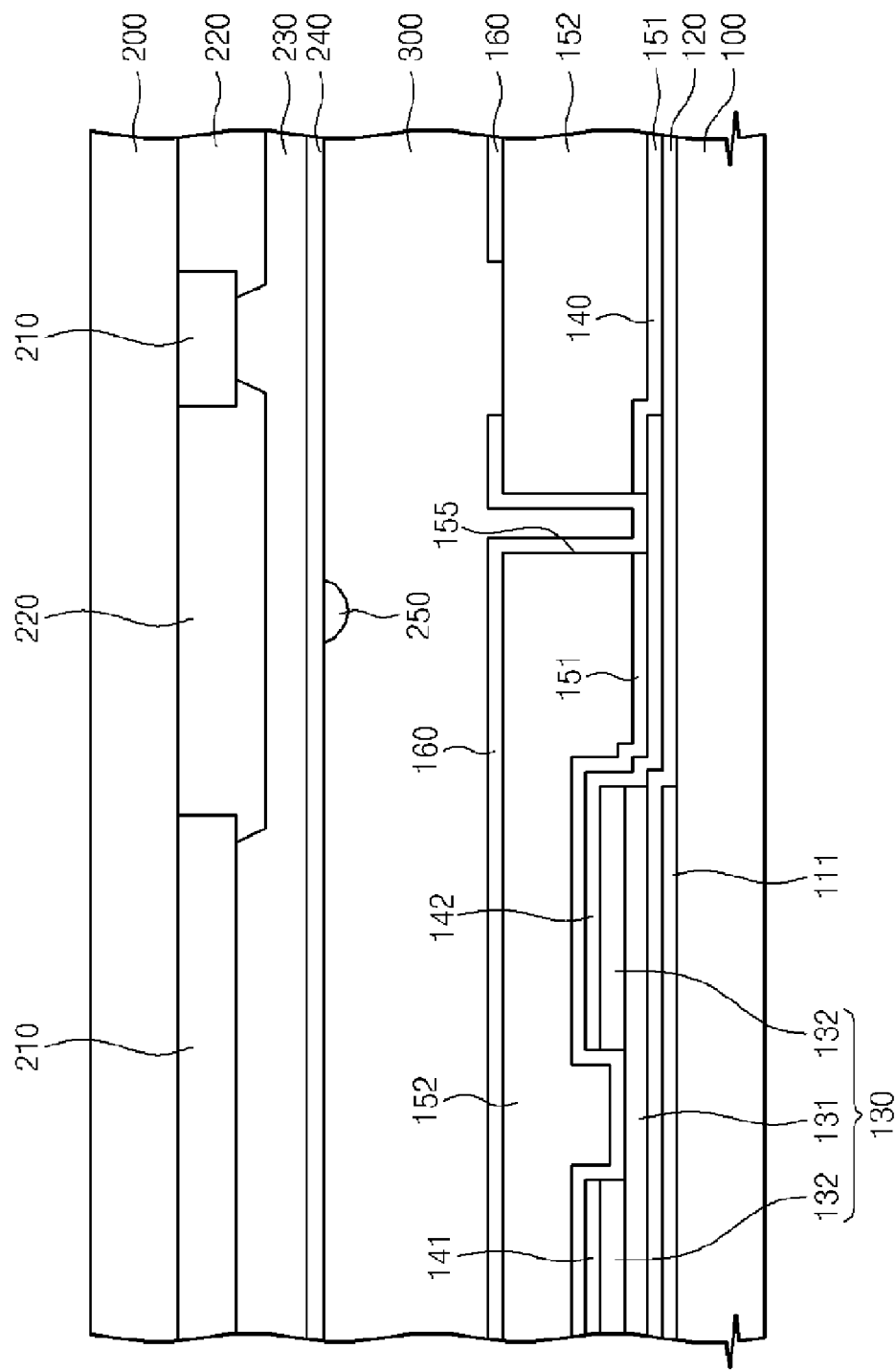
FIG. 12 is a sectional view taken along line II-II' of FIG. 11.

FIG. 11 is a plan view showing the LCD device according to a ninth exemplary embodiment of the present invention, and FIG. 12 is a sectional view taken along line II-II' in FIG. 11.

Referring to FIG. 11 and FIG. 12, the LCD device includes first and second substrates 100 and 200 and a liquid crystal layer 300 interposed there between. Pixel electrodes 160 have shapes identical to those of the seventh exemplary embodiment described above. Data lines 140 are linearly formed vertically to gate lines 110. Thus, the length of the data lines 140 may be reduced, lowering resistance.

The protective layers 151 and 152 are formed on the entire surface of the substrate 100 to cover source electrodes 141 and drain electrodes 142. The protective layers 151 and 152 have a dual-layered structure including an inorganic layer 151 and an organic layer 152. The organic layer 152 may have a thick thickness of a few micrometers, so that the vertical distance between the source electrode 141 and the pixel electrode 160 may be increased. Considering that the source electrode 141 extends from the data lines 140, the vertical distance between the data lines 140 and the pixel electrode 160 may also be increased due to the organic layer 152.

A common electrode 240 is formed on the second substrate 200. The common electrode 240 includes a domain divider 250 in the form of an insulating protrusion.

As shown in FIG. 11, the data lines 140 overlap the pixel electrodes 160 in the pixel areas. Since the data lines 140 vertically overlap the pixel electrodes 160, the data lines 140 and the pixel electrodes 160 are capacitively coupled to each other. Accordingly, the data voltage applied to the pixel electrodes 160 may be distorted by the signal transmitted to the data lines 140. The organic layer 152 increases the distance between the data line 140 and the pixel electrode 160 and blocks the capacitive coupling so as to prevent the distortion of the data voltage.

Figure 13:
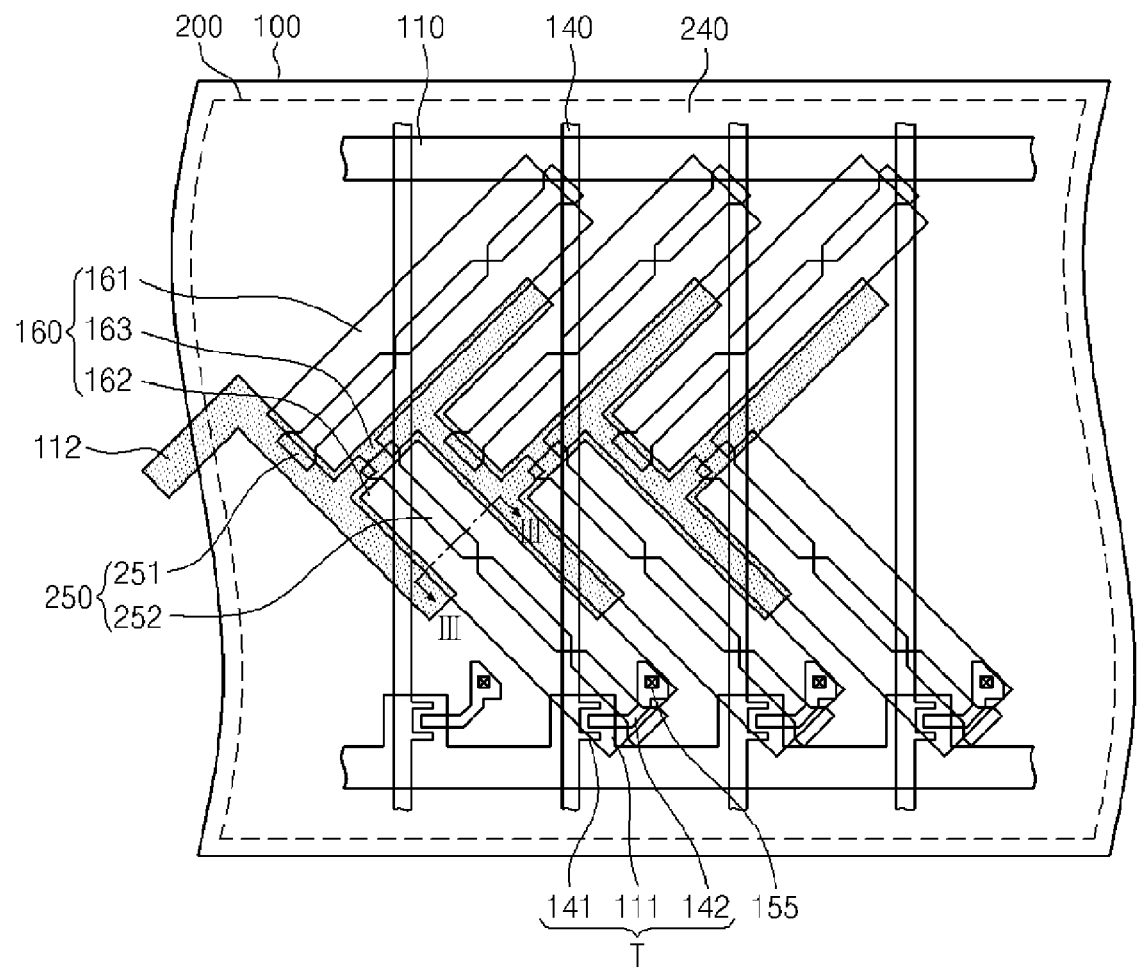
FIG. 13 is a plan view showing the LCD device according to a tenth exemplary embodiment of the present invention.
Figure 14:
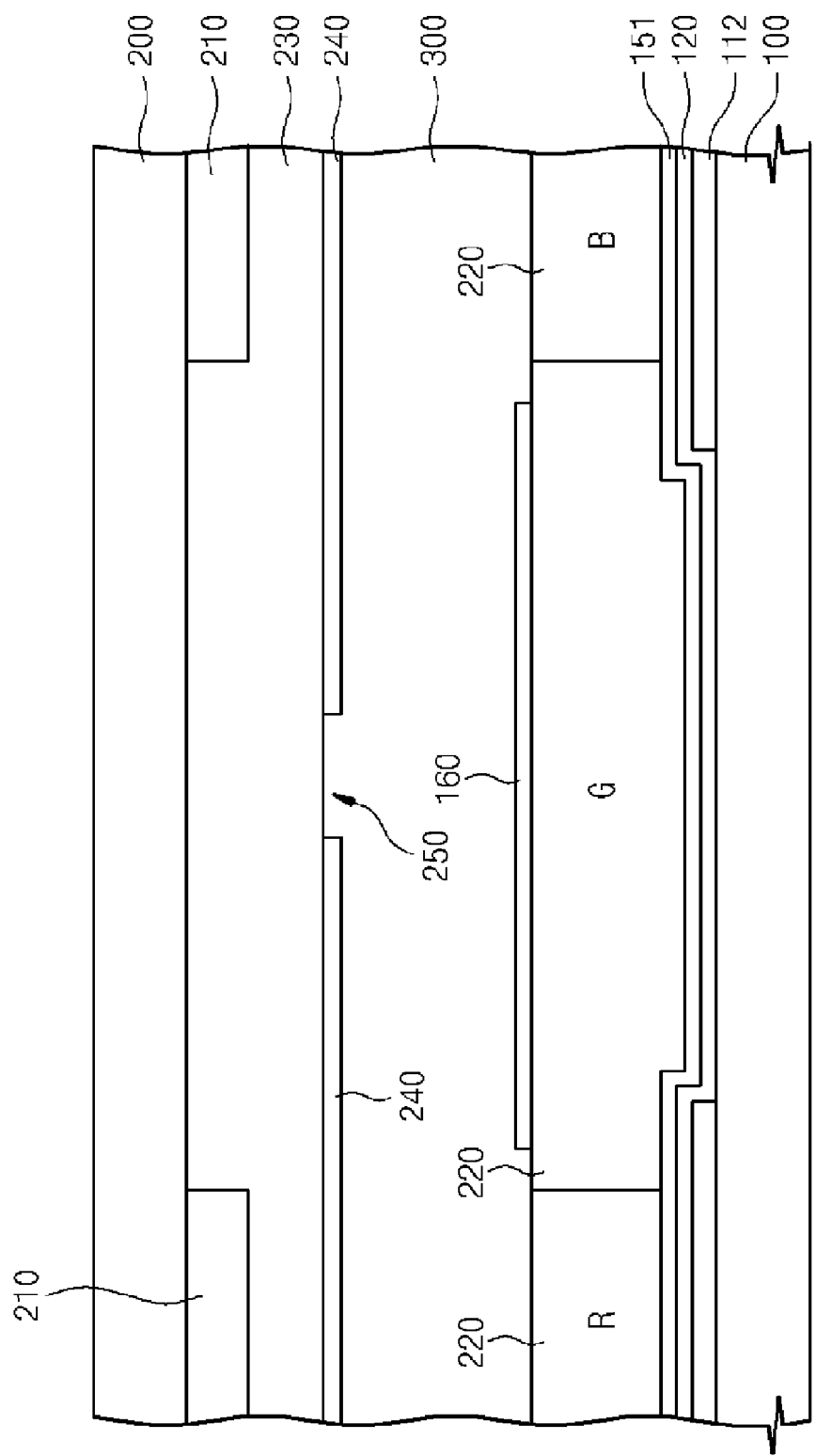
FIG. 14 is a sectional view taken along line III-III' of FIG. 13.

FIG. 13 is a plan view showing the LCD device according to a tenth exemplary embodiment of the present invention, and FIG. 14 is a sectional view taken along line III-III' in FIG. 13.

Referring to FIG. 13 and FIG. 14, a storage electrode 112 is provided on the first substrate 100. The storage electrode 112 overlaps the pixel electrode 160 stacked on the storage electrode so as to form a storage capacitor. The storage capacitor serves to maintain the data voltage during a predetermined period.

The storage electrode 112 includes a conductive material capable of blocking light, so that the aperture ratio may be reduced in an area where the storage electrode 112 is formed. In the present exemplary embodiment, the storage electrode 112 has a shape corresponding to that of the pixel electrode 160 at a boundary region of the pixel area while extending in the first and second directions D1 and D2. In other words, the storage electrode 112 is formed on the region covered by the light blocking film pattern 210, so that the reduction of the aperture ratio due to the storage electrode 112 may be minimized.

The storage electrode 112 is provided thereon with the gate insulating layer 120 and the protective layer 151. The protective layer 151 is formed thereon with color filters 220. The color filters 220 display a color image by combining the three primary colors, red R, green G, and blue B, which are alternately placed on the pixel areas. In addition, the color filter 220 is formed on the first substrate 100, thereby increasing the vertical distance between the data line 140 and the pixel electrode 160. Thus, the color filter 220 may prevent the capacitive coupling between the data line 140 and the pixel electrode 160 without employing the organic layer 152 described in the ninth exemplary embodiment. However, the organic layer 152 may be optionally provided on the color filter 220 in order to reinforce the protection function.

According to the above-mentioned embodiments of the present invention, liquid crystals are aligned in various directions according to various domains so that the viewing angle of the LCD device may be widened. In addition, the liquid crystals may be aligned with predetermined directionality in a boundary of the domains so as to improve the operating speed of the LCD device.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
a first substrate;
a gate line and a data line disposed on the first substrate, the gate line and the data line crossing each other and insulated from each other;
a first sub-pixel electrode and a second sub-pixel electrode disposed on the data line and spaced apart from each other;
a second substrate facing the first substrate;
a common electrode disposed on the second substrate and comprising a first domain divider and a second domain divider spaced apart from each other; and
a liquid crystal layer interposed between the first substrate and the second substrate,
wherein the first domain divider is positioned on the center of the first sub-pixel electrode, and the first domain divider and the first sub-pixel electrode extend in a first direction,
the second domain divider is positioned on the center of the second sub-pixel electrode, and the second domain divider and the second sub-pixel electrode extend in a second direction that is different from the first direction, and
a virtual line extending from an end portion of the second domain divider in the second direction meets with an end portion of the first sub-pixel electrode, wherein the data line is substantially perpendicular to the gate line.

2. A liquid crystal display device, comprising:
a first substrate;
a gate line and a data line disposed on the first substrate, the gate line and the data line crossing each other and insulated from each other;
a first sub-pixel electrode and a second sub-pixel electrode disposed on the data line and spaced apart from each other;
a second substrate facing the first substrate;
a common electrode disposed on the second substrate and comprising a first domain divider and a second domain divider spaced apart from each other; and
a liquid crystal layer interposed between the first substrate and the second substrate,
wherein the first domain divider is positioned on the center of the first sub-pixel electrode, and the first domain divider and the first sub-pixel electrode extend in a first direction,
the second domain divider is positioned on the center of the second sub-pixel electrode, and the second domain divider and the second sub-pixel electrode extend in a second direction that is different from the first direction, and
a virtual line extending from an end portion of the second domain divider in the second direction meets with an end portion of the first sub-pixel electrode, wherein the data line is curved in the first direction and the second direction along the first sub-pixel electrode and the second sub-pixel electrode.

3. A liquid crystal display device, comprising:
a first substrate;
a gate line and a data line disposed on the first substrate, the gate line and the data line crossing each other and insulated from each other;
a first sub-pixel electrode and a second sub-pixel electrode disposed on the data line and spaced apart from each other;

a second substrate facing the first substrate;
a common electrode disposed on the second substrate and comprising a first domain divider and a second domain divider spaced apart from each other;
a liquid crystal layer interposed between the first substrate and the second substrate; and
a connection electrode disposed on an area overlapping the virtual line to connect the first sub-pixel electrode to the second sub-pixel electrode,
wherein the first domain divider is positioned on the center of the first sub-pixel electrode, and the first domain divider and the first sub-pixel electrode extend in a first direction, the second domain divider is positioned on the center of the second sub-pixel electrode, and the second domain divider and the second sub-pixel electrode extend in a second direction that is different from the first direction, and a virtual line extending from an end portion of the second domain divider in the second direction meets with an end portion of the first sub-pixel electrode,
wherein the first sub-pixel electrode comprises:
  a first long lateral side extending substantially in the first direction and connected to the connection electrode;
  a second long lateral side facing the first long lateral side;
  a first short lateral side extending substantially in the second direction in an area adjacent to the connection electrode and connecting the first long lateral side to the second long lateral side; and
  a second short lateral side facing the first short lateral side and connecting the first long lateral side to the second long lateral side,
wherein the second sub-pixel electrode comprises:
  a third long lateral side and a fourth long lateral side facing each other and extending substantially in the second direction;
  a third short lateral side extending substantially in the first direction in an area adjacent to the connection electrode, connecting the third long lateral side to the fourth long lateral side and facing the first long lateral side; and
  a fourth short lateral side facing the third short lateral side and connecting the third long lateral side to the fourth long lateral side,
wherein the second short lateral side and the fourth short lateral side are substantially parallel to the first short lateral side and the third short lateral side, respectively, wherein a width of the connection electrode is narrower than a width of the first domain divider and a width of the second domain divider,
wherein each of the first domain divider and the second domain divider comprises:
a body having a first width;
an expanded portion provided in an area adjacent to the first sub-pixel electrode and the second sub-pixel electrode, respectively, and having a second width larger than the first width; and
a connection portion connecting the body to the expanded portion and having a gradually increasing width,
wherein one end of the connection portion has a width equal to the first width and the opposite end of the connection portion has a width equal to the second width,
wherein edges of the short lateral side of the first sub-pixel electrode and the short lateral side of the second sub-pixel electrode comprise a chamfered oblique surface in an area adjacent to the connection electrode.

4. A liquid crystal display device, comprising:
a first substrate;
a gate line and a data line disposed on the first substrate, the gate line and the data line crossing each other and insulated from each other;
a first sub-pixel electrode and a second sub-pixel electrode disposed on the data line and spaced apart from each other;
a second substrate facing the first substrate;
a common electrode disposed on the second substrate and comprising a first domain divider and a second domain divider spaced apart from each other;
a liquid crystal layer interposed between the first substrate and the second substrate; and
a connection electrode disposed on an area overlapping the virtual line to connect the first sub-pixel electrode to the second sub-pixel electrode,
wherein the first domain divider is positioned on the center of the first sub-pixel electrode, and the first domain divider and the first sub-pixel electrode extend in a first direction, the second domain divider is positioned on the center of the second sub-pixel electrode, and the second domain divider and the second sub-pixel electrode extend in a second direction that is different from the first direction, and a virtual line extending from an end portion of the second domain divider in the second direction meets with an end portion of the first sub-pixel electrode,
wherein the first sub-pixel electrode comprises:
  a first long lateral side extending substantially in the first direction and connected to the connection electrode;
  a second long lateral side facing the first long lateral side;
  a first short lateral side extending substantially in the second direction in an area adjacent to the connection electrode and connecting the first long lateral side to the second long lateral side; and
  a second short lateral side facing the first short lateral side and connecting the first long lateral side to the second long lateral side,
wherein the second sub-pixel electrode comprises:
  a third long lateral side and a fourth long lateral side facing each other and extending substantially in the second direction;
  a third short lateral side extending substantially in the first direction in an area adjacent to the connection electrode, connecting the third long lateral side to the fourth long lateral side and facing the first long lateral side; and
  a fourth short lateral side facing the third short lateral side and connecting the third long lateral side to the fourth long lateral side,
wherein the second short lateral side and the fourth short lateral side are substantially parallel to the gate line, wherein a width of the connection electrode is narrower than a width of the first domain divider and a width of the second domain divider,
wherein each of the first domain divider and the second domain divider comprises:
a body having a first width;
an expanded portion provided in an area adjacent to the first sub-pixel electrode and the second sub-pixel electrode, respectively, and having a second width larger than the first width; and
a connection portion connecting the body to the expanded portion and having a gradually increasing width, wherein one end of the connection portion has a width equal to the first width and the opposite end of the connection portion has a width equal to the second width, wherein edges of the short lateral side of the first sub-pixel electrode and the short lateral side of the second sub-pixel electrode comprise a chamfered oblique surface in an area adjacent to the connection electrode.

5. A liquid crystal display device, comprising:

a first substrate;

a gate line and a data line disposed on the first substrate, the gate line and the data line crossing each other and insulated from each other;

a first sub-pixel electrode and a second sub-pixel electrode disposed on the data line and spaced apart from each other;

a second substrate facing the first substrate;

a common electrode disposed on the second substrate and comprising a first domain divider and a second domain divider spaced apart from each other;

a liquid crystal layer interposed between the first substrate and the second substrate; and a connection electrode disposed on an area overlapping the virtual line to connect the first sub-pixel electrode to the second sub-pixel electrode, wherein the first domain divider is positioned on the center of the first sub-pixel electrode, and the first domain divider and the first sub-pixel electrode extend in a first direction, the second domain divider is positioned on the center of the second sub-pixel electrode, and the second domain divider and the second sub-pixel electrode extend in a second direction that is different from the first direction, and a virtual line extending from an end portion of the second domain divider in the second direction meets with an end portion of the first sub-pixel electrode, wherein a width of the connection electrode is narrower than a width of the first domain divider and a width of the second domain divider, wherein each of the first domain divider and the second domain divider comprises:

a body having a first width;

an expanded portion provided in an area adjacent to the first sub-pixel electrode and the second sub-pixel electrode, respectively, and having a second width larger than the first width; and a connection portion connecting the body to the expanded portion and having a gradually increasing width, wherein one end of the connection portion has a width equal to the first width and the opposite end of the connection portion has a width equal to the second width, wherein the second sub-pixel electrode comprises a chamfered oblique surface in an area adjacent to the connection electrode and the first sub-pixel electrode includes a protruded oblique surface having a shape corresponding to a shape of the chamfered oblique surface, wherein a length of the protruded oblique surface is controlled such that the protruded oblique surface does not overlap the second domain divider in a plan view.

6. A liquid crystal display device, comprising:

a first substrate;

a gate line and a data line disposed on the first substrate, the gate line and the data line crossing each other and insulated from each other;

a first sub-pixel electrode and a second sub-pixel electrode disposed on the data line and spaced apart from each other;

a second substrate facing the first substrate;

a common electrode disposed on the second substrate and comprising a first domain divider and a second domain divider spaced apart from each other;

a liquid crystal layer interposed between the first substrate and the second substrate; and a connection electrode disposed on an area overlapping the virtual line to connect the first sub-pixel electrode to the second sub-pixel electrode, wherein the first domain divider is positioned on the center of the first sub-pixel electrode, and the first domain divider and the first sub-pixel electrode extend in a first direction, the second domain divider is positioned on the center of the second sub-pixel electrode, and the second domain divider and the second sub-pixel electrode extend in a second direction that is different from the first direction, and a virtual line extending from an end portion of the second domain divider in the second direction meets with an end portion of the first sub-pixel electrode, wherein the first sub-pixel electrode comprises:

a first long lateral side extending substantially in the first direction and connected to the connection electrode;

a second long lateral side facing the first long lateral side;

a first short lateral side extending substantially in the second direction in an area adjacent to the connection electrode and connecting the first long lateral side to the second long lateral side; and a second short lateral side facing the first short lateral side and connecting the first long lateral side to the second long lateral side, wherein the second sub-pixel electrode comprises:

a third long lateral side and a fourth long lateral side facing each other and extending substantially in the second direction;

a third short lateral side extending substantially in the first direction in an area adjacent to the connection electrode, connecting the third long lateral side to the fourth long lateral side and facing the first long lateral side; and a fourth short lateral side facing the third short lateral side and connecting the third long lateral side to the fourth long lateral side, wherein the second short lateral side and the fourth short lateral side are substantially parallel to the first short lateral side and the third short lateral side, respectively, wherein a width of the connection electrode is narrower than a width of the first domain divider and a width of the second domain divider, wherein each of the first domain divider and the second domain divider comprises:

a body having a first width;

an expanded portion provided in an area adjacent to the first sub-pixel electrode and the second sub-pixel electrode, respectively, and having a second width larger than the first width; and a connection portion connecting the body to the expanded portion and having a gradually increasing width, wherein one end of the connection portion has a width equal to the first width and the opposite end of the connection portion has a width equal to the second width, wherein the second sub-pixel electrode comprises a chamfered oblique surface in an area adjacent to the connection electrode and the first sub-pixel electrode includes a protruded oblique surface having a shape corresponding to a shape of the chamfered oblique surface.

7. A liquid crystal display device, comprising:
a first substrate;
a gate line and a data line disposed on the first substrate, the gate line and the data line crossing each other and insulated from each other;
a first sub-pixel electrode and a second sub-pixel electrode disposed on the data line and spaced apart from each other;
a second substrate facing the first substrate;
a common electrode disposed on the second substrate and comprising a first domain divider and a second domain divider spaced apart from each other;
a liquid crystal layer interposed between the first substrate and the second substrate; and
a connection electrode disposed on an area overlapping the virtual line to connect the first sub-pixel electrode to the second sub-pixel electrode,
wherein the first domain divider is positioned on the center of the first sub-pixel electrode, and the first domain divider and the first sub-pixel electrode extend in a first direction, the second domain divider is positioned on the center of the second sub-pixel electrode, and the second domain divider and the second sub-pixel electrode extend in a second direction that is different from the first direction, and a virtual line extending from an end portion of the second domain divider in the second direction meets with an end portion of the first sub-pixel electrode,
wherein the first sub-pixel electrode comprises:
a first long lateral side extending substantially in the first direction and connected to the connection electrode;
a second long lateral side facing the first long lateral side;
a first short lateral side extending substantially in the second direction in an area adjacent to the connection electrode and connecting the first long lateral side to the second long lateral side; and
a second short lateral side facing the first short lateral side and connecting the first long lateral side to the second long lateral side,
wherein the second sub-pixel electrode comprises:
a third long lateral side and a fourth long lateral side facing each other and extending substantially in the second direction;
a third short lateral side extending substantially in the first direction in an area adjacent to the connection electrode, connecting the third long lateral side to the fourth long lateral side and facing the first long lateral side; and
a fourth short lateral side facing the third short lateral side and connecting the third long lateral side to the fourth long lateral side,
wherein the second short lateral side and the fourth short lateral side are substantially parallel to the gate line,
wherein a width of the connection electrode is narrower than a width of the first domain divider and a width of the second domain divider,
wherein each of the first domain divider and the second domain divider comprises:
a body having a first width;
an expanded portion provided in an area adjacent to the first sub-pixel electrode and the second sub-pixel electrode, respectively, and having a second width larger than the first width; and
a connection portion connecting the body to the expanded portion and having a gradually increasing width,
wherein one end of the connection portion has a width equal to the first width and the opposite end of the connection portion has a width equal to the second width,
wherein the second sub-pixel electrode comprises a chamfered oblique surface in an area adjacent to the connection electrode and the first sub-pixel electrode includes a protruded oblique surface having a shape corresponding to a shape of the chamfered oblique surface.

8. A liquid crystal display device, comprising:
a first substrate;
a gate line and a data line disposed on the first substrate, the gate line and the data line crossing each other and insulated from each other;
a first sub-pixel electrode and a second sub-pixel electrode disposed on the data line and spaced apart from each other;
a second substrate facing the first substrate;
a common electrode disposed on the second substrate and comprising a first domain divider and a second domain divider spaced apart from each other; and
a liquid crystal layer interposed between the first substrate and the second substrate,
wherein the first domain divider is positioned on the center of the first sub-pixel electrode, and the first domain divider and the first sub-pixel electrode extend in a first direction,
the second domain divider is positioned on the center of the second sub-pixel electrode, and the second domain divider and the second sub-pixel electrode extend in a second direction that is different from the first direction, and
a virtual line extending from an end portion of the second domain divider in the second direction meets with an end portion of the first sub-pixel electrode, wherein at least one of the first domain divider and second domain divider has a notch adjusting an alignment of the liquid crystals.

* * * * *